Nov. 19, 1940.  D. R. BERLIN  2,221,905
ENGINE COWLING AND COOLING
Filed May 16, 1939  2 Sheets-Sheet 1

INVENTOR
DONOVAN R. BERLIN.
BY
ATTORNEY

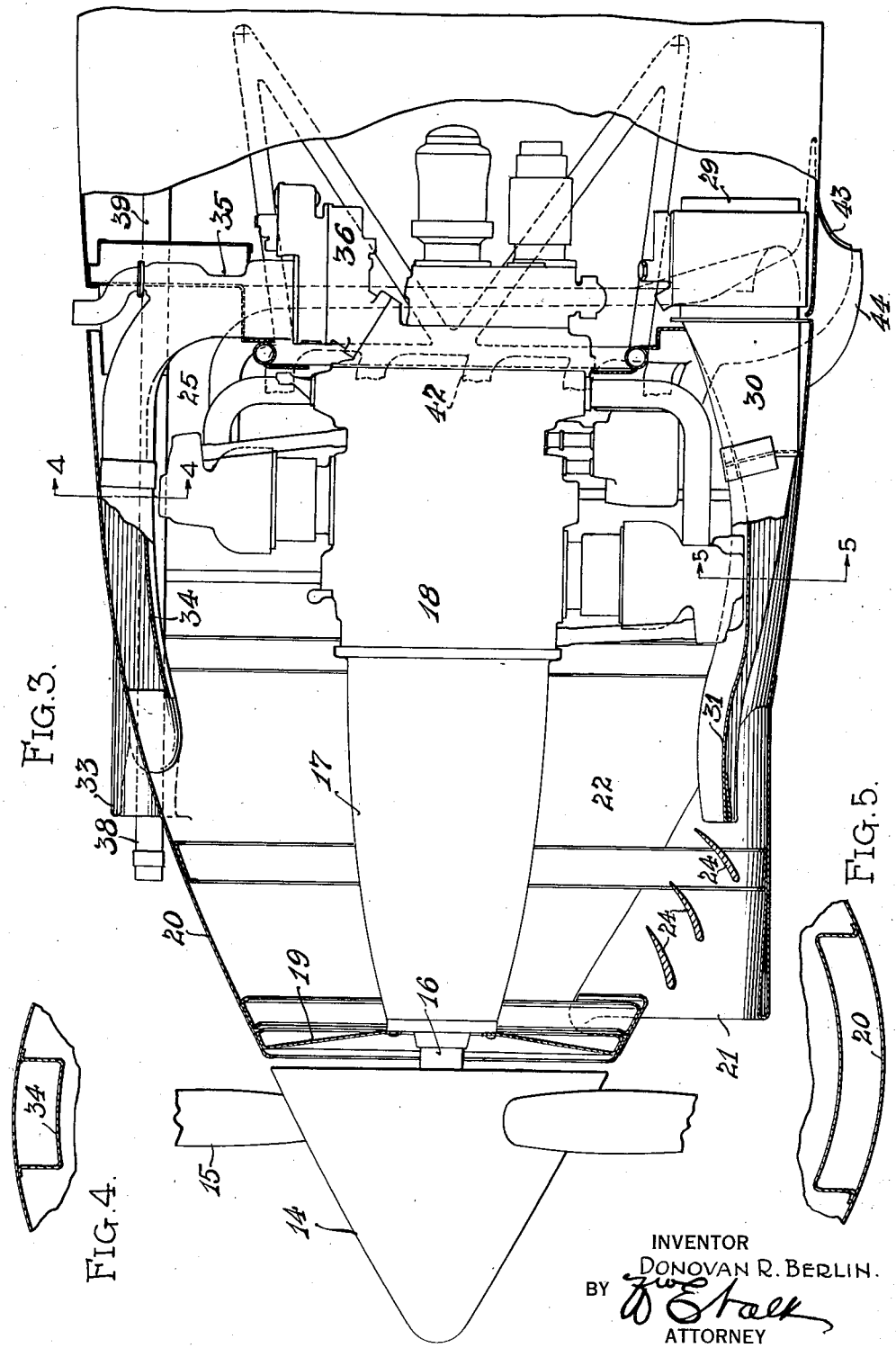

Patented Nov. 19, 1940

2,221,905

UNITED STATES PATENT OFFICE 2,221,905

ENGINE COWLING AND COOLING

Donovan R. Berlin, Eggertsville, N. Y., assignor to Curtiss-Wright Corporation, a corporation of Delaware Application May 16, 1939, Serial No. 273,869

12 Claims. (Cl. 244—53)

This invention relates to the cooling and cowling of aircraft power plants and in particular provides certain improvements in streamlined cowling as adapted for use with air cooled radial cylinder engines.

An object of the invention is to provide a cowling arrangement within which an engine is enclosed and within which is formed an air containing reservoir or chamber, the chamber being provided with an air entrance and being of such size as to provide a reservoir in which air may build up considerable pressure to afford uniform and optimum engine cooling. A further object of the invention is to provide a cowling system for an engine in which the fineness of the organization is improved greatly over conventional prior art practice. Still another object is to provide a cowling arrangement whose drag shall be low, permitting of an increase in speed of the aircraft with which it is used. Another object is to provide an air cooling system in which the air intake scoop is presented to the incoming air at a point to make optimum use of the propeller slip stream, wherefor the size of the opening may be minimized to the avoidance of excessive drag. A further object is to provide a ramming air scoop for the engine intake system, a further object related thereto being to utilize the ramming air scoop as a cooling channel for aircraft accessories. Further objects will become apparent in reading the annexed description in connection with the drawings in which:

Figure 2:
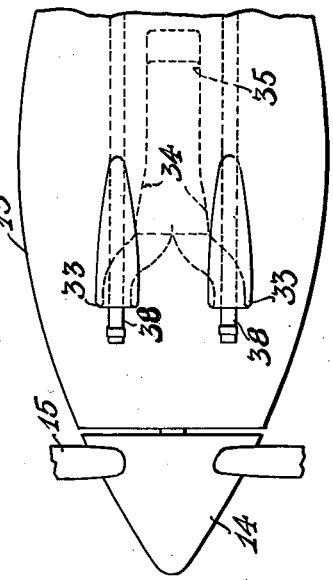
Fig. 2 is a plan of the forward part of the cowling system.

Fig. 3 is an enlarged diagrammatic section through the cowling, showing the location of the power plant therewithin and, Figs. 4 and 5 are sections on the lines 4—4 and 5—5 of Fig. 3, respectively.

In recent years, considerable development work has been accomplished in improving the cooling and cowling of radial cylinder aircraft engines, the presently conventional arrangement comprising an engine embracing cowling having an axial air entrance opening rearward of the propeller within which cooling air is entrained, this cooling air passing the propeller disc and being discharged through an annular cowl opening rearward of the engine. Ordinarily, the propeller is secured to the engine power shaft a relatively short distance ahead of the engine disc whereby the engine disc, which is of fairly large size, encroaches upon the propeller disc forming a rather large protuberance immediately rearward of the propeller by which some propeller efficiency is lost and by which the fine streamlining of the power plant as a whole is seriously interfered with. Fine streamlining becomes increasingly important as speeds approach an order of 400 miles per hour. Proposals have been offered to submerge the engines within a thick wing of the airplane, carrying the propeller drive shaft forward or rearward of the wing, as an extension, and upon which the propeller is mounted. Such systems have distinct possibilities with respect to multi-engine aircraft but fail to offer particularly advantageous solutions for the improvement in streamlining of single engine aircraft, and further, require the development of entirely new power plants. This invention provides an arrangement of radial air-cooled engine, cowling, and propeller which affords a well-streamlined forward fuselage end, along with improvements in cooling and general aerodynamic cleanness in the installation.

In referring to the drawings, the normal airplane fuselage is indicated at 10, this being provided with a main sustaining wing 11 and with accommodations for the aircraft crew indicated as the cockpit 12. The fuselage is extended forwardly as a power plant section 13 of streamlined form, the section 13 converging gradually to a propeller spinner 14 to afford a smoothly profiled sharp air entrance. In detail, the spinner 14 comprises a cone-shaped element embracing the hub of a propeller 15 which is carried upon a power shaft 16 extending beyond the forward end of a long nose extension 17 secured rigidly to the crankcase 18 of the radial cylinder engine. The extension 17 is of considerable length and as shown, its length being almost as great as the diameter of the engine itself. To the forward end of the extension 17 a diaphragm 19 is secured to provide support for the forward end of cowling 20 which extends rearwardly as a streamlined prolongation of the spinner 14, to embrace the engine and to provide, between the diaphragm 19 and the engine cylinders, a large reservoir for the entrainment of cooling air. At the forward end of the cowling 20 a segmental air scoop 21 is provided, this scoop lying immediately rearward of the propeller disc and opening to the chamber 22 within the forward end of the cowling 20, at the forward end thereof. The scoop 21 is preferably located on the under side of the cowling so that effective cooling air entrainment will be afforded in all attitudes of the airplane from zero to high angle of attack in which attitudes good engine cooling is normally required. In negative angle of attack conditions, engine cooling is not so important so that the blanketing of the scoop 21 by the spinner 14 is of no particular moment.

Figure 1:
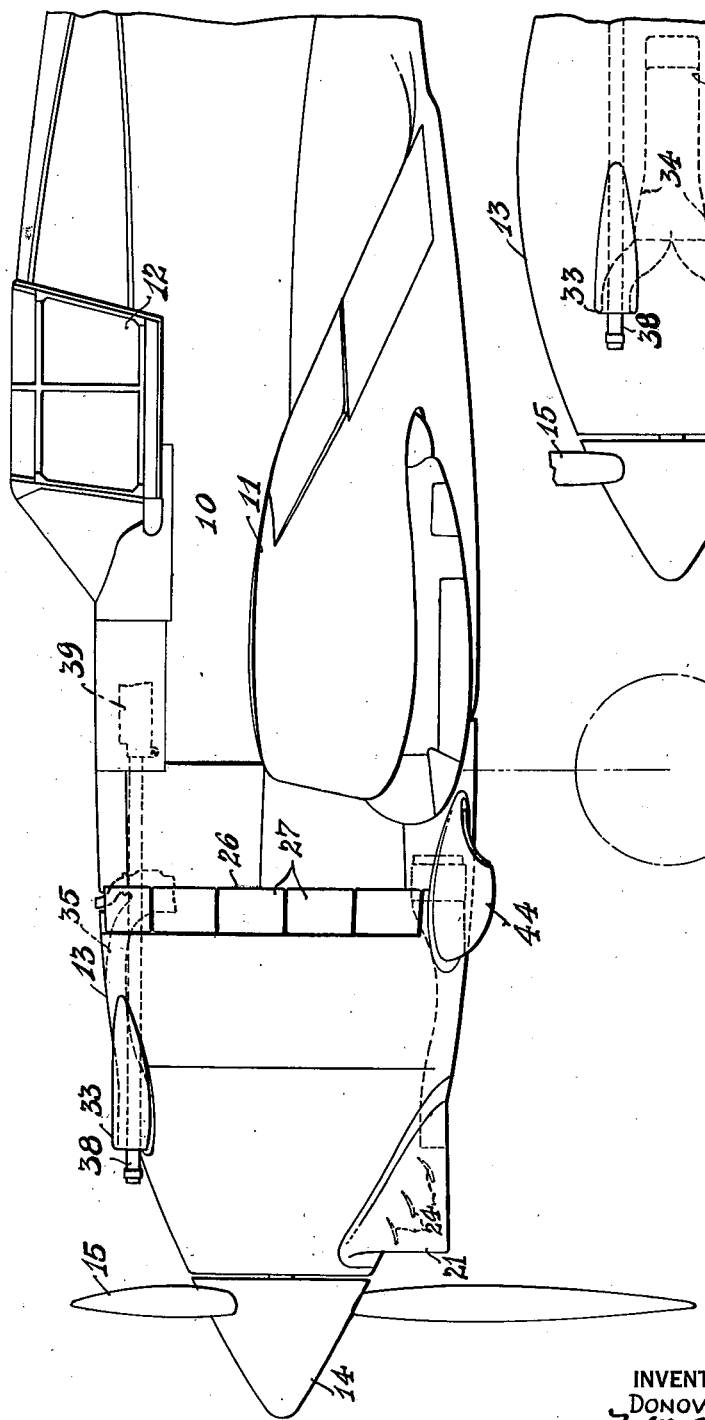
Fig. 1 is a side elevation of the forward part of an airplane embodying the invention.

Within the scoop 21, a plurality of guide vanes 24 are disposed, these vanes being placed crosswise of the scoop entrance and being curved to deflect entering air upwardly into the forward part of the chamber 22. The vanes 24 are also disposed to act as a diffuser by which the high velocity head of entering air is converted to pressure head of the air within the chamber 22. The size of the chamber is such that the air in the reservoir loses a great deal of its turbulence before passing the engine cylinders, and, in loosing its turbulence the relatively quiet air is enabled to pass the cooling fins of the engine without undue eddying whereby the pressure differential existing across the engine provides for more effective engine cooling than has heretofore been realized. In prior practice where the air entraining space ahead of the engine is restricted, the air in this space is believed to be very turbulent and, although the pressure difference across the engine is utilized for effective engine cooling, it is quite probable that the turbulent air, even though the pressure differential may be high, is not as effective in cooling as less turbulent air under the same pressure differential conditions might be. Rearward of the engine in a zone such as 25, air passing the engine disc is permitted to circulate around the accessory section of the engine and is directed back to the atmosphere through an annular exit slot indicated at 26 in Fig. 1 and controlled as to its area by suitable controllable flaps 27. The invention is not considered to be restricted to the use of an annular air exit slot.

The modern installation calls for cooling of the engine oil and a radiator for this purpose is shown at 29 in Fig. 3. Oil piping connections between the engine and oil radiator are well-known in the art and are omitted to avoid confusion in the drawings but the air entrance to the oil cooler is shown as comprising a conduit 30 defined exteriorly by the cowling 20 and interiorly by a plate element 31 which terminates at its forward end within the scoop 21, the plate 31 defining at its forward end an air entrance opening for the oil cooler. Air issuing from the oil cooler blends with the balance of air rearward of the engine and is issued to the atmosphere through the exit slot 26.

A further improvement afforded by the invention comprises ramming air intake scoops 33 extending a short distance above the top of the cowling 20 and leading through a Y connection 34 and a conduit 35 to the intake of the engine carburetor indicated at 36. When the system is used for military aircraft having fixed machine guns, the scoops 33 may form the opening in the aircraft through which the barrels 38 of machine guns 39 may project. With this arrangement, the gun barrels are kept cool by the constant blast of air passing through the scoops so that when the guns are operated, automatic cooling therefor is afforded. The volume of air passing through the scoop for engine consumption is so great that comparatively little temperature rise would be caused therein by the transfer of heat from the gun barrels thereto, since the guns are operated intermittently and the amount of heat given up thereby is not great. Without cooling provision for the guns, however, their proper operation may be seriously interferred with.

In summarizing the general advantages of this invention, a long engine nose permits of a gradually tapered engine embracing cowling which is deemed essential where extremely high flight speeds are desired. The long engine nose permits of the formation of a large cooling air reservoir therearound and within the cowling by which engine cooling is greatly improved. The air scoop for engine cooling air is disposed in an optimum position for receiving propeller blast and accordingly, the scoop may have substantially less area, with consequent reduction in drag, than has heretofore been deemed to be necessary. The finely pointed spinner and cowling permits of airflow thereover in a substantially longitudinal direction, as distinguished from the substantially radial direction of airflow which is enforced in the blunt nose cowlings of conventional practice.

The engine exhaust system is shown as comprising a manifold 42 passing through the lower part of the fuselage and directed rearwardly as at 43 for the discharge of engine exhaust gases. The end of the manifold is preferably enclosed by a fairing 44 in spaced relation thereto and the size of the opening of the manifold is so arranged as to provide a velocity of outflowing exhaust gas somewhat greater than the normal flight velocity whereby a slight booster effect is obtained as the exhaust gas meets the surrounding atmosphere. A certain amount of air in the rear of the engine emanates to the atmosphere between the manifold end 43 and the cowling 44 so that the manifold is cooled and the velocity gradient between the exhaust gas and the surrounding air is blended to afford a minimum turbulence as the exhaust gas meets the atmosphere, thereby affording a further reduction in drag.

The installation of this system in a full scale aircraft has been very successful and the refinement in design secured by the careful attention to the details herein noted is considered fully justified by the improved results obtained.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft, in combination, a radial air-cooled engine having a forward structurally integral extension carrying the engine power shaft the latter carrying a propeller whose plane is at least one engine diameter forward of the plane of the engine cylinders, a spinner on said propeller defining a streamlined nose for the aircraft, a fixed cowling embracing said extension and engine profiled as a tapered streamlined continuation of said spinner, defining within the cowling ahead of the engine and around said extension a large chamber extending axially from the spinner rearward face to the front of the engine, and a segmental air entraining scoop at the forward lower end of said cowling having its opening immediately rearward of the propeller, whereby cooling air entering the scoop enters said chamber and builds up pressure therein, said cowling having an opening therein rearward of the engine for exit airflow of that air which passes from said chamber past the engine.

2. In aircraft, in combination, a radial air-cooled engine having a forward structurally integral extension carrying the engine power shaft the latter carrying a propeller whose plane is at least one engine diameter forward of the plane of the engine cylinders, a spinner on said propeller defining a streamlined nose for the aircraft, a fixed cowling embracing said extension and engine profiled as a tapered streamlined continuation of said spinner, defining within the cowling ahead of the engine and around said extension a large chamber extending axially from the spinner rearward face to the front of the engine, a segmental air entraining scoop at the forward end of said cowling having its opening immediately rearward of the propeller, whereby cooling air entering the scoop enters said chamber and builds up pressure therein, said cowling having an opening therein rearward of the engine for exit airflow of that air which passes from said chamber past the engine, and means at the scoop opening for distributing air entering thereat substantially uniformly through said chamber.

3. In an aircraft comprising a cowling enclosed engine adapted to consume air, a machine gun projecting through said cowling, and an air scoop adjacent and embracing the gun muzzle through which air passes over said gun for cooling same and thence to said engine.

4. In an aircraft power plant installation comprising a cowling embraced engine having an air entrance, an air intake scoop in the cowling, a conduit connecting the scoop with the engine air entrance, and a machine gun mounted on the aircraft having its barrel in said conduit.

5. In an aircraft power plant installation comprising a cowling embraced engine having an air entrance, an air intake scoop in the cowling, a conduit connecting the scoop with the engine air entrance, and a machine gun mounted on the aircraft having its barrel in said conduit and its muzzle projecting through the scoop opening, whereby the gun is cooled by air passing through the scoop and conduit to the engine.

6. In aircraft, a substantially circular cowling structure defining a large hollow chamber, a radial air-cooled engine therein toward the rear end thereof, a divided air scoop toward the front of the cowling through which air passes to said chamber and to an engine auxiliary within the cowling, the chamber acting as an air reservoir for engine cooling air which passes therefrom over the engine cylinders, and means rearward of the engine providing a discharge opening for air which has passed over the engine and over said auxiliary.

7. In aircraft, a substantially circular cowling structure defining a large hollow chamber, a radial air-cooled engine therein toward the rear end thereof, an air scoop toward the front of the cowling through which air passes to said chamber, the chamber acting as an air reservoir for engine cooling air which passes therefrom over the engine cylinders, and means rearward of the engine providing a discharge opening for air which has passed over the engine, said chamber having a length at least as great as the engine diameter and having a fore-and-aft tapering profile.

8. In aircraft, a substantially circular cowling structure defining a large hollow chamber, a radial air-cooled engine therein toward the rear end thereof, an air scoop toward the front of the cowling through which air passes to said chamber, the chamber acting as an air reservoir for engine cooling air which passes therefrom over the engine cylinders, and means rearward of the engine providing a discharge opening for air which has passed over the engine, said chamber having a length at least as great as the engine diameter and having a fore-and-aft tapering profile, an engine nose extension passing forwardly through said chamber, and a propeller, carrying a spinner profiled to the cowl contour, carried on said extension, the propeller lying just forward of said scoop.

9. In aircraft, a substantially circular cowling structure defining a large hollow chamber, a radial air-cooled engine therein toward the rear end thereof, an air scoop toward the front of the cowling through which air passes to said chamber, the chamber acting as an an air reservoir for engine cooling air which passes therefrom over the engine cylinders, means rearward of the engine providing a discharge opening for air which has passed over the engine, an engine accessory requiring cooling, and a cooling air duct having an air entrance opening adjacent said scoop and directing air entering same toward said accessory.

10. In aircraft including an engine having a carburetor requiring air, a ramming intake duct open at its forward end to the slipstream and leading to said carburetor, and an air-cooled machine gun having its barrel disposed in said duct.

11. In aircraft including an air consuming engine having an air entrance, a duct from the outside of the aircraft to said entrance, adapted to conduct outside air to the engine, and an auxiliary mechanism requiring air-cooling disposed in said duct, said duct extending longitudinally of the aircraft adjacent the forward covering thereof and said auxiliary mechanism comprising an air-cooled machine gun.

12. In aircraft, in combination, a radial air-cooled engine having a forward structurally integral extension carrying the engine power shaft, the latter carrying a propeller whose plane is at least one engine diameter forward of the plane of the engine cylinders, a spinner on said propeller defining a streamlined nose for the aircraft, a fixed cowling embracing said extension and engine profiled as a tapered streamlined continuation of said spinner, defining within the cowling ahead of the engine and around said extension a large chamber extending axially from the spinner rearward face to the front of the engine, a segmental air entraining scoop at the forward lower end of said cowling having its opening immediately rearward of the propeller, whereby cooling air entering the scoop enters said chamber and builds up pressure therein, said cowling having an opening therein rearward of the engine for exit airflow of that air which passes from said chamber past the engine, an air intake scoop at the forward upper end of said cowling, a conduit connecting the scoop with an air entrance of the engine which is independent of airflow from said chamber, and a machine gun mounted on the aircraft having its barrel disposed in said conduit for cooling by air passing therethrough.

DONOVAN R. BERLIN.